(12) United States Patent
Jibbe (10) Patent No.: US 8,312,130 B2
(45) Date of Patent: *Nov. 13, 2012

(54) CONFIGURATION VERIFICATION, RECOMMENDATION, AND ANIMATION METHOD FOR A DISK ARRAY IN A STORAGE AREA NETWORK (SAN)

(75) Inventor: Mahmoud K. Jibbe, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/235,985

(22) Filed: Sep. 19, 2011

(65) Prior Publication Data

US 2012/0072565 A1 Mar. 22, 2012

Related U.S. Application Data

(63) Continuation of application No. 11/416,537, filed on May 3, 2006, now Pat. No. 8,024,440.

(51) Int. Cl.
*G06F 15/173* (2006.01)
(52) U.S. Cl. .................. 709/223; 709/220; 715/734
(58) Field of Classification Search ............ 709/223
See application file for complete search history.

(56) References Cited

U.S. PATENT DOCUMENTS

| | | | |
|---|---|---|---|
| 5,819,042 A | 10/1998 | Hansen | |
| 5,838,907 A | 11/1998 | Hansen | |
| 5,960,451 A | 9/1999 | Voigt et al. | |
| 6,384,842 B1 | 5/2002 | DeKoning et al. | |
| 6,519,679 B2 | 2/2003 | Devireddy et al. | |
| 6,772,204 B1 | 8/2004 | Hansen | |
| 7,107,534 B1 | 9/2006 | de Jong et al. | |
| 7,143,260 B2 | 11/2006 | Dalal et al. | |
| 7,322,010 B1 | 1/2008 | Mikula | |
| 7,386,585 B2 | 6/2008 | Agrawal et al. | |
| 2003/0135609 A1 | 7/2003 | Carlson et al. | |
| 2003/0237017 A1 | 12/2003 | Jibbe | |
| 2004/0006612 A1 | 1/2004 | Jibbe et al. | |
| 2006/0095664 A1* | 5/2006 | Wichelman et al. | 711/114 |
| 2007/0022185 A1 | 1/2007 | Hamilton et al. | |

OTHER PUBLICATIONS

Nathan J. Muller, "Advanced Drawing Tools Aid Network Planning"; International Journal of Network Management archive; vol. 7, Issue 6 (Nov.-Dec. 1997); pp. 324-333; 1997; ISSN:1099-1190; Publisher John Wiley & Sons.

* cited by examiner

*Primary Examiner* — Alina N Boutah
*Assistant Examiner* — June Sison
(74) *Attorney, Agent, or Firm* — Haynes and Boone, LLP (57) ABSTRACT

A system and method for establishing a storage area network (SAN) is described. The method includes providing a predefined template for inputting data associated with a SAN. A first tool may utilize the template to validate an entered SAN configuration based on accessing data in a database. A second tool may utilize the template to generate a valid SAN configuration, based on accessing SAN data in a database, if component data is entered. An animated configuration of a valid SAN is generated based on at least one of the input SAN configuration or the input component data.

20 Claims, 7 Drawing Sheets

| Configuration List |||||
|---|---|---|---|---|
| Configuration Name: |||||
| 2x1 Setup Number |||||
| |||||
| Additional Info |||||
| Host System(s) | Host(1) | Host(2) | PDC Workstation | |
| Host Type (Vendor/Model): |||||
| OS Version: |||||
| Patches: |||||
| Clustering Version/Patches: |||||
| Host Bus Adapter(s) | HBA(1) | HBA(2) | HBA(3) | HBA(4) |
| Vendor: |||||
| Model and S/N: |||||
| Driver: |||||
| Firmware: |||||
| Bios: |||||
| Topology |||||
| Hub Vendor: |||||
| Hub Model and S/N: |||||
| Hub FW: |||||
| Switch Vendor: |||||
| Switch Model and S/N: |||||
| Switch FW: |||||
| GBIC Vendor: |||||
| Cable Vendor: |||||
| Controller |||||
| Model: | 2882 | 5884 | 6190 | 4884 |
| Revision Level: |||||
| Processor Memory Size: |||||
| RPA Memory Size: |||||
| Firmware: |||||
| Bootware: |||||
| Snapware: |||||
| NVSRAM: |||||
| Non-Default Options: |||||
| SYMsm |||||
| Client Version: |||||
| Agent Version: |||||
| Util Version: |||||
| Runtime Version: |||||
| Drive Tray(s) |||||
| Tray Type: |||||
| ESM Revision Level: |||||
| ESM FW: |||||
| Drive Type(s): |||||
| Drive Capacity: |||||
| Drive Firmware: |||||
| Drive Servo Code: |||||
| Drive Mode Pages: |||||
| Additional Info: |||||

CONFIGURATION VERIFICATION, RECOMMENDATION, AND ANIMATION METHOD FOR A DISK ARRAY IN A STORAGE AREA NETWORK (SAN)

CROSS-REFERENCE TO RELATED APPLICATIONS

The present application is a continuation application of the U.S. patent application Ser. No. 11/416,537, filed May 3, 2006, now U.S. Pat. No. 8,024,440, granted Sep. 20, 2011 which is incorporated by reference herein in its entirety.

FIELD OF THE INVENTION

The present invention relates to the field of storage area network (SAN) and particularly to a system and method for configuration verification, recommendation, and animation for aiding in establishing a SAN.

BACKGROUND OF THE INVENTION

Establishment of a SAN may be difficult due to the user's failure to follow set-up guidelines and to read provided literature. While a more sophisticated user having a certain level of knowledge regarding the network may implement his or her own knowledge and successfully establish the network, a less sophisticated user may have to rely on technical support, which increases expenses for the manufacturer, or obtain the services of an experienced technician to assist in establishing the network. Technical support for establishing a SAN is often difficult as support personnel spend an extensive amount of time isolating configuration issues by telephonic communication. SAN configurations often are highly dependent on the end user's needs, thereby requiring proper configuration selection to ensure maximum capability for the overall SAN. These efforts may be exasperated by incorrect information provided by the on-site personnel requiring assistance. Further difficulties include a user selecting additional components which are not certified for the SAN.

Utilization of extensive literature, provided with an array system, is problematic as the documentation may be misinterpreted by the end user. In other instances, the end user will avoid reading the documentation altogether or only read selected sections thus potentially missing key information.

Therefore, it would be desirable to provide a method and system for configuration verification, recommendation and animation for aiding in establishing a SAN to permit lesser experienced personnel to establish a SAN without the drawbacks previously experienced.

SUMMARY OF THE INVENTION

Accordingly, the present invention is directed to a system and method for establishing a SAN.

In a first aspect of the invention, a method for establishing a SAN is described. The method includes providing a predefined template for inputting data associated with a SAN. A first tool may utilize the template to validate an entered SAN configuration based on accessing data in a database. A second tool may utilize the template to generate a valid SAN configuration, based on accessing SAN data in a database, if component data is entered. An animated configuration of a valid SAN is generated based on at least one of the input SAN configurations or the input component data.

In a further aspect of the present invention, a software system for SAN establishment is disclosed. The system includes the following: an electronically readable medium stored on a computer readable memory device and encoded to cause a central processing unit executing the software system for storage area network establishment to effectively generate a template for inputting SAN data; a database of SAN data; a first tool for determining if an input SAN configuration is valid; and a second tool for recommending a valid SAN configuration, if component data is input, such system generates an animated configuration of a valid SAN based on SAN data input to the template.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
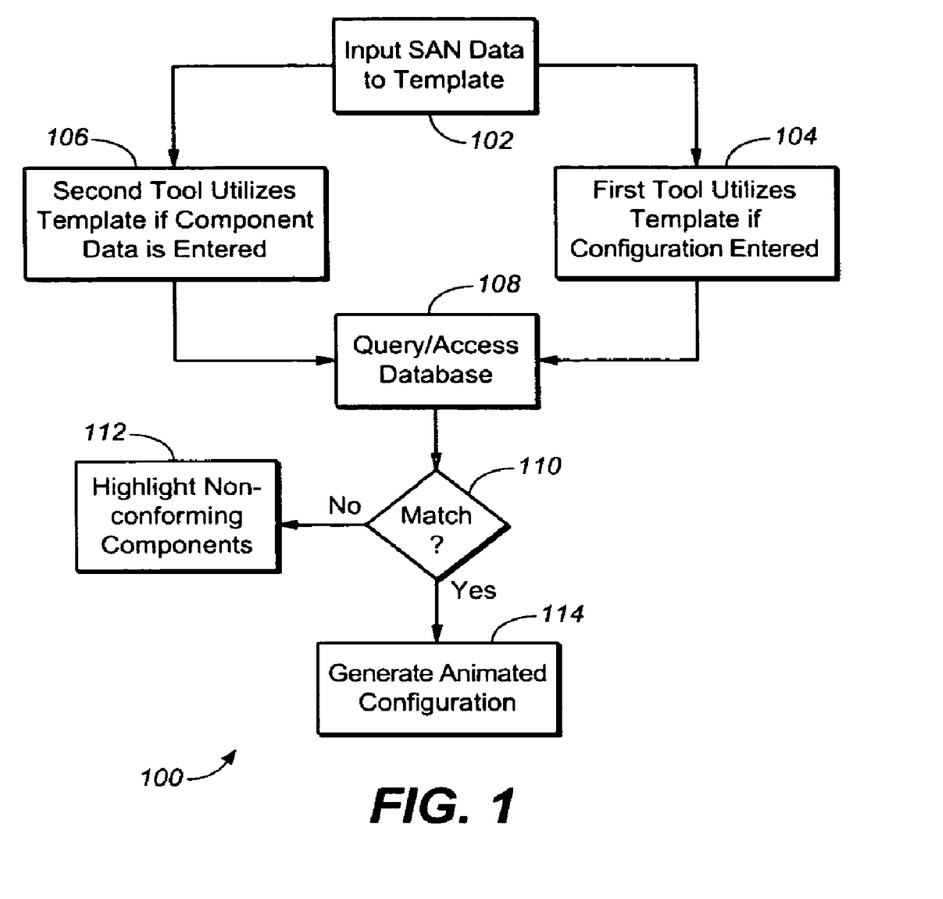
FIG. 1 is a flow diagram illustrating a method 100 for SAN establishment.

Referring to FIG. 1, a method 100 for establishing a SAN is discussed. In a preferred embodiment, the method of the present invention may be included as software, firmware, distributed over a network (such as an internet, an intranet, or the Internet), or the like for causing a general purpose computing system to execute the method 100. The method 100 of the present invention may minimize the difficulty for a user to establish a SAN network and assist in establishing a SAN having optimized characteristics for the included components. The method may reduce the likelihood of an improper configuration which requires technical support. The method 100 includes providing 102 a predefined template for inputting data associated with a SAN. Input data may include a user configuration, component information, desired characteristics, and the like information defining SAN components and SAN configuration.

For example, a configuration to be tested is entered for validation or component information to the template in order to obtain a recommended valid configuration. A graphical user interface (GUI) may be implemented to aid in data input, permit efficient parameters changes, allow for reconfiguration, and the like. The predefined template may include a redundant array of independent disks (RAID) selection portion, a user input portion for identifying and storing resultant information, a SAN data input portion, a manipulation selection portion, a data entry portion, and the like. Associated SAN data may include component data, wiring configuration, zoning configuration, host clustering, software parameters, host bus adapters, a RAID configuration, or the like information for establishing a SAN. For example, component data input is utilized to verify component interoperability and suitability for a selected RAID configuration, included in the SAN, prior to obtaining the components. In a further example, a SAN configuration is input to a predefined template to verify the operability of the configuration.

In a first example, a first tool utilizes the predefined template 104 to test an input configuration to determine, if the configuration is valid. In the foregoing manner, the first tool queries a database of SAN data 108 for validation of the entered configuration. For instance, the first tool is selected by picking the build. It is contemplated that a configuration button may be included in the template.

Correspondingly, a second tool may be selected 106 by picking the build a configuration template button from the manipulation selection portion of the predefined template. In this manner, the second tool accesses the database 108 to generate a valid configuration. The SAN database may include component data, wiring configuration, zoning configuration, host clustering, software parameters, a RAID configuration, and the like information associated with SAN establishment.

With continued reference to FIG. 1, a second tool may be selected to utilize the template 106 to generate a verified SAN configuration based on component information input into the provided template. For example, component data including the model number and software configuration (including software update version) of the various components entered in the template are compared with a database query 108. For instance, the "recommend a configuration" button is selected from the manipulation selection portion included in a predefined template. The second tool may then access 108 the database to determine a valid SAN configuration for the input component data. If the component data matches a valid configuration, an animated configuration is generated 114. A step-by-step procedure for establishing the animated SAN may be recommended as well. Printed literature or documentation may be cross-referenced for the step-by-step procedure by interacting with the animated SAN configuration or selecting the functionality. In other instances, even if the configuration is validated, the method may include displaying a recommendation for a specific component, such as if the component acts as a rate limiting factor or bottleneck to some pre-specified degree.

If some or all components fail to match with SAN data in the database an incompatibility warning or highlight is provided. The warning or highlight may identify the component as incompatible with other included components or identify a component which is not included in the database. In further instances, the warning may suggest the user update the database with additional information from a manufacturer maintained database such as by downloading additional information from a manufacturer website or recommend the user obtain a database update. In other instances, component data is parsed to determine if a software update to the incompatible component should be performed such that an existing component may be made operable with a new or improved software revision. If no match is found in the database, a recommendation may be made for a conforming component. For instance, if an incompatible RAID controller is included in the input data the database is accessed to recommend a conforming controller.

In a further embodiment, the method 100 may additionally include recommending an optimized SAN configuration based on entered component information. In the present embodiment, a SAN animation is provided which corresponds to an optimized configuration. The optimized configuration is arranged to make most efficient utilization of the included components corresponding to the entered SAN component data. Thus, if multiple valid configurations are possible, a system conducting the method may test the configurations to determine if one of the configurations offers superior functionality for the overall system. In the previous manner, the capability of the overall system is maximized. Optimization may additionally include recommending replacement of one or more components to achieve greater functional capacity. For instance, if an included switch is a bottleneck, optimization may additionally include providing an indication that greater functionality is achievable with the replacement of a component. Thus, a user may select to replace the switch to achieve a greater throughput (i.e., a geometric increase, an exponential increase, or the like) for the system to some specified level.

Figure 2A:
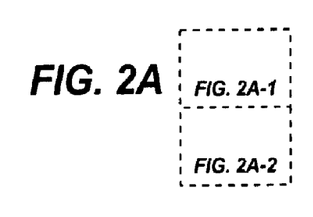
FIG. 2A is a highly illustrative representation of a graphical user interface (GUI) of a predefined template in accordance with an exemplary embodiment of the present invention.
Figure 2A:
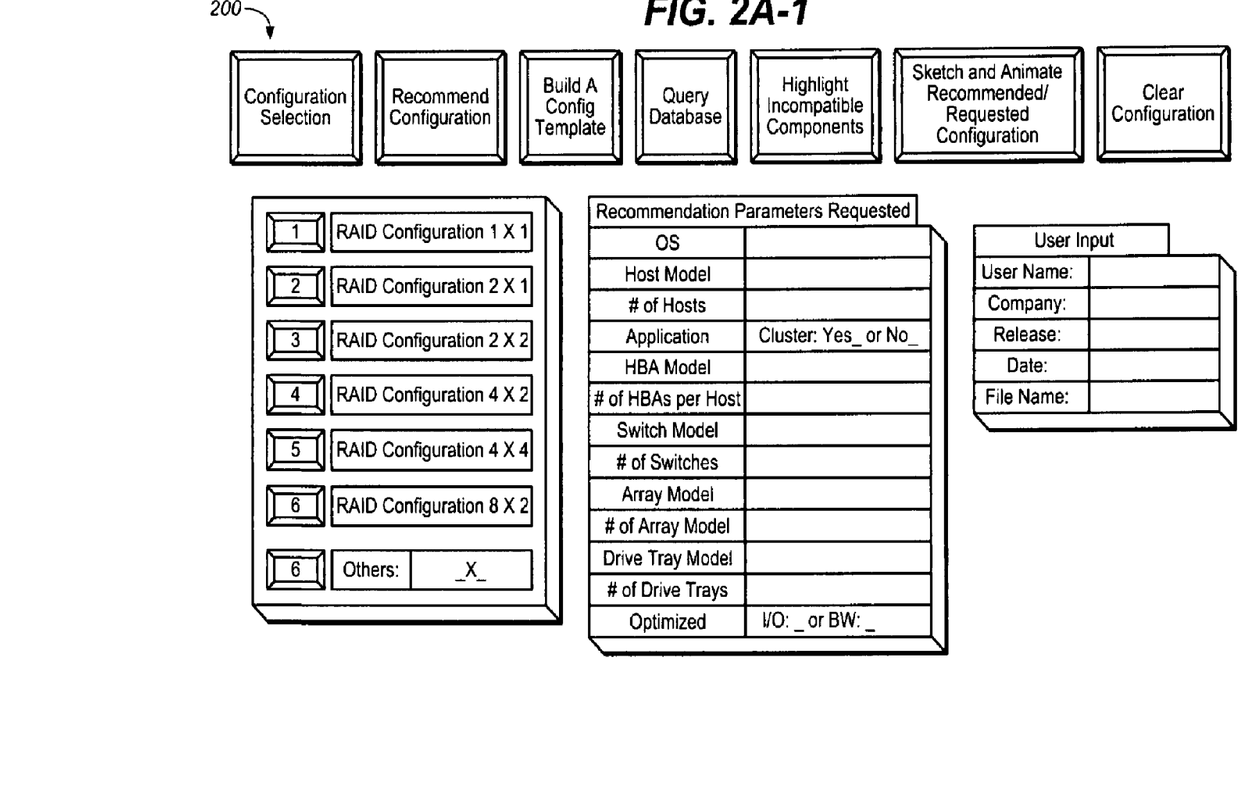
FIG. 2B is a highly illustrative representation of the GUI template of FIG. 2A including an animated configuration in accordance with an exemplary embodiment of the present invention.
FIG. 2C is an illustration providing additional detail of the SAN data input portion or work area represented in FIG. 2B in accordance with an exemplary embodiment of the present invention.
FIG. 2D is an illustration providing additional detail of the configuration sketch portion represented in FIG. 2B in accordance with an exemplary embodiment of the present invention.
Figure 2A:
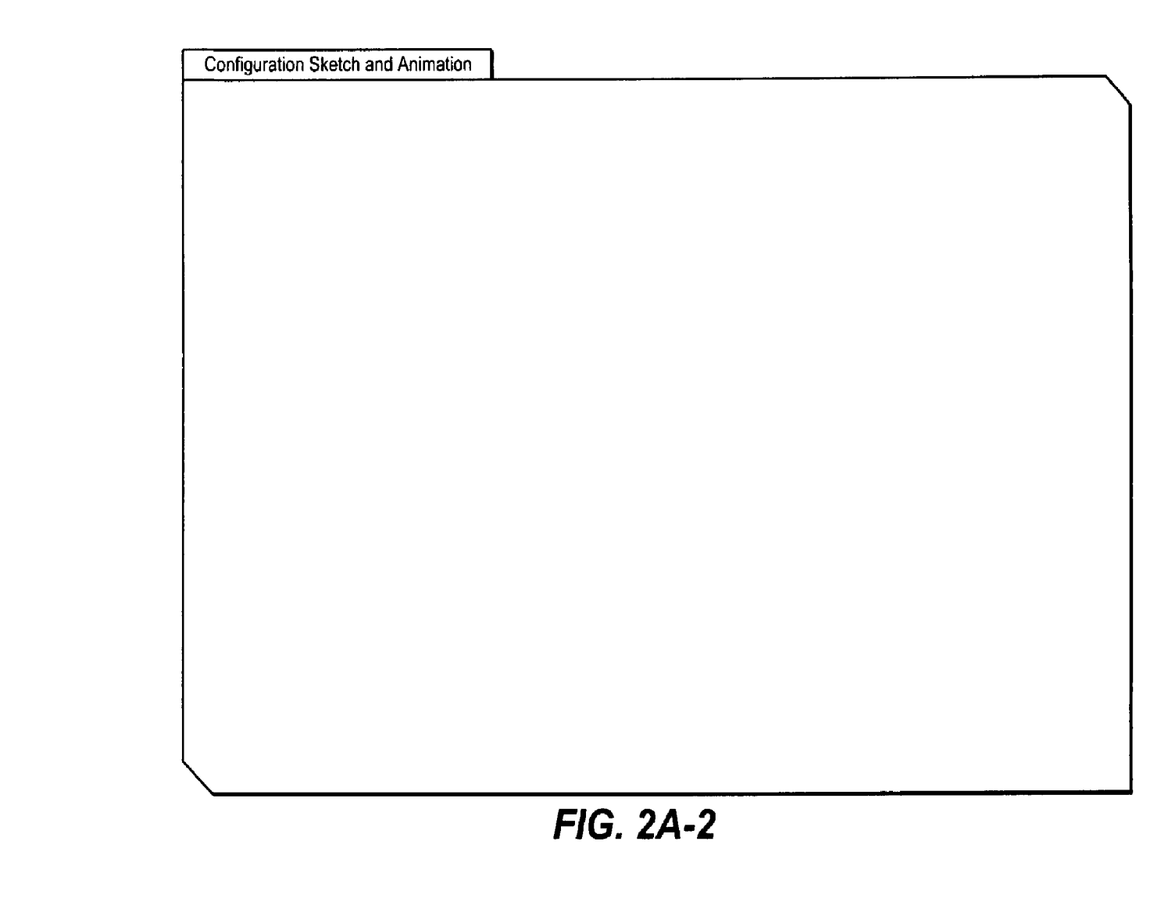
Figure 2B:
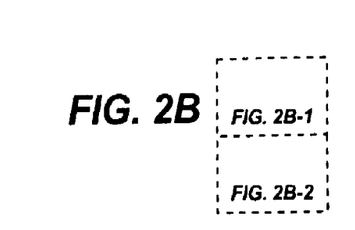
Figure 2B:
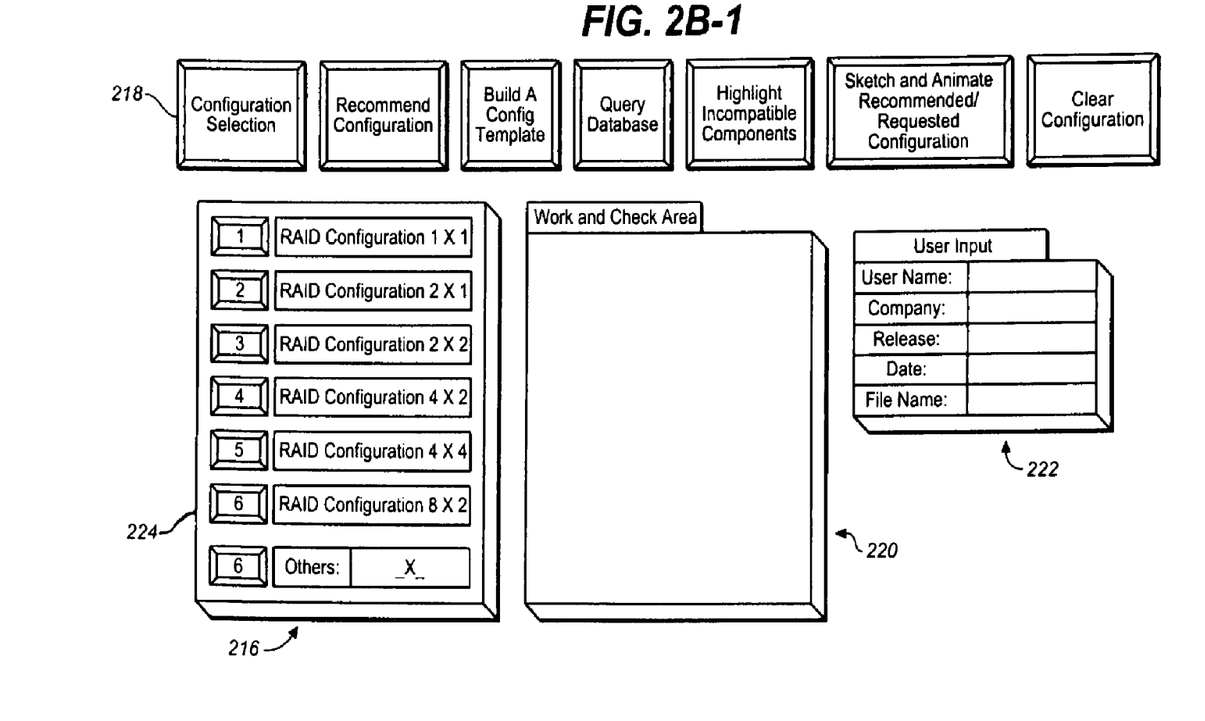
Figure 2B:
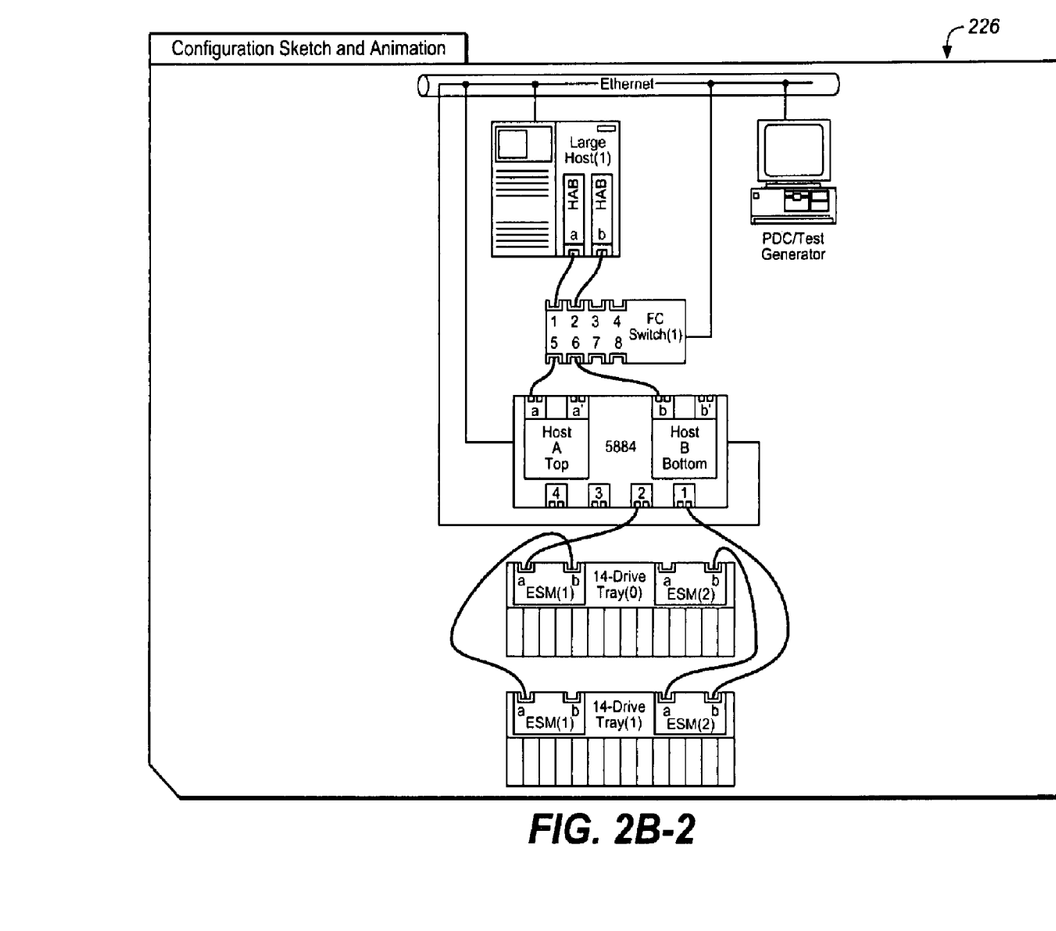

Referring to FIGS. 2A and 2B, a highly illustrative representation of a graphical user interface (GUI) of a predefined template 200 in accordance with an exemplary embodiment of the present invention is shown. The system may include an electronically readable medium encoded to cause a central processing unit to generate included various elements. This may include providing encoded electronic information via a network communication link, a download from a remote information handling system, and the like. The software system includes a predefined template 200 configured for inputting data associated with a SAN. Referring to FIG. 2B, a highly illustrative representation of the GUI template of FIG. 2A including an animated configuration in accordance with an exemplary embodiment of the present invention is shown. As is illustrated in FIG. 2B, SAN data may be entered into a SAN data input portion or work area 220 included in the template. SAN data includes component data, RAID configuration data, and the like parameters associated with a SAN.

Figure 2C:
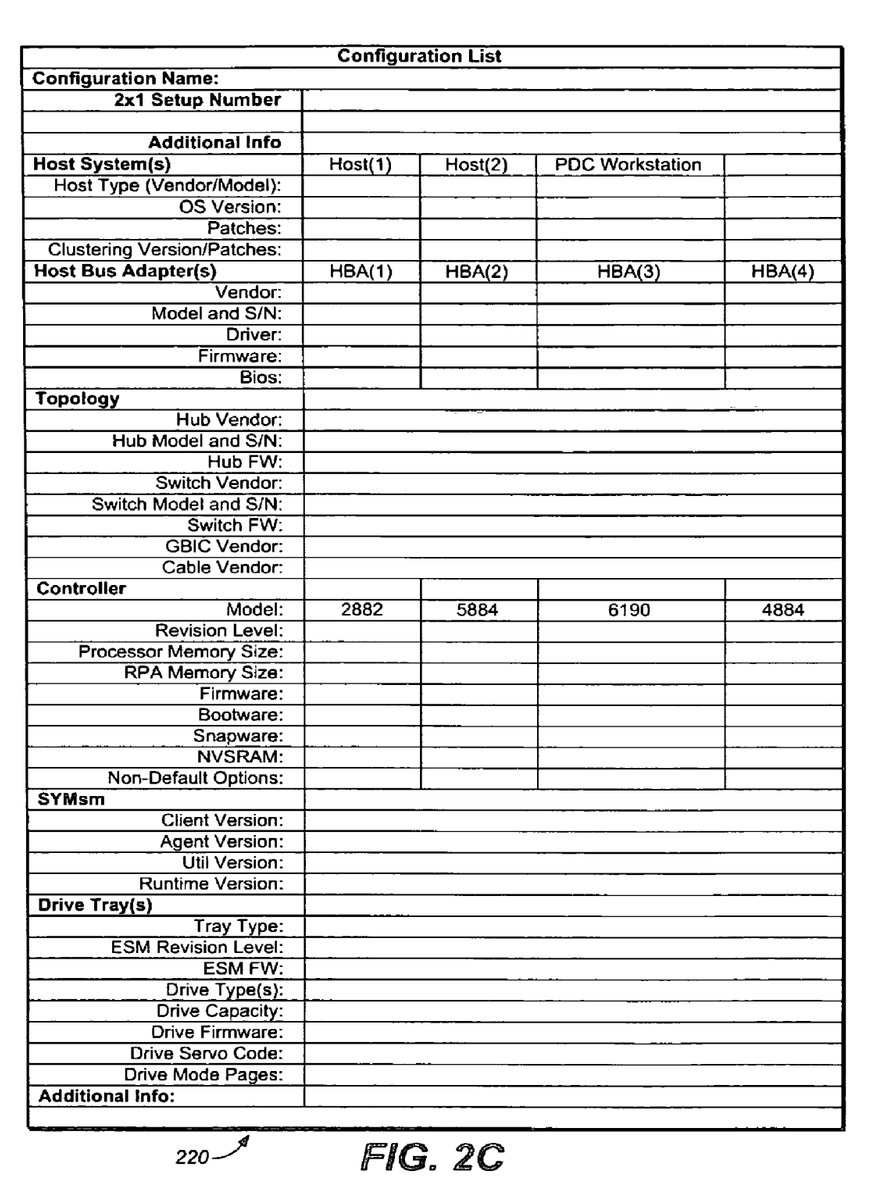

Referring to FIG. 2C, an illustration providing additional detail of the SAN data input portion or work area represented in FIG. 2B in accordance with an exemplary embodiment of the present invention is shown. In this specific example, additional data for identifying or saving the data is entered into a user input portion 220 for identifying and storing resultant information. For instance, the template 216 includes a manipulation selection portion 218 for permitting selection of the type of manipulation to be performed. Representative selections include recommending a configuration, build a configuration, and the like for interfacing with input data. A desired RAID configuration may be picked from a RAID selection portion 224 included in the template.

A first tool is included in the system for determining if a SAN configuration entered to the template 200 is valid. The first tool is utilized to validate an input configuration, including component data, with the database of SAN data. The first tool accesses the database to determine if the configuration is valid based on known-good configurations, SAN data, and/or component data stored in the database. If incompatible components or other configuration errors exist, a user may select to highlight the incompatible component or provide an indication of the hardware or software which is the source of the error. In other examples, a warning is generated for the noncompatible hardware or software. If no match is found based on entered information, an update display may prompt the user to update the database.

Figure 2D:
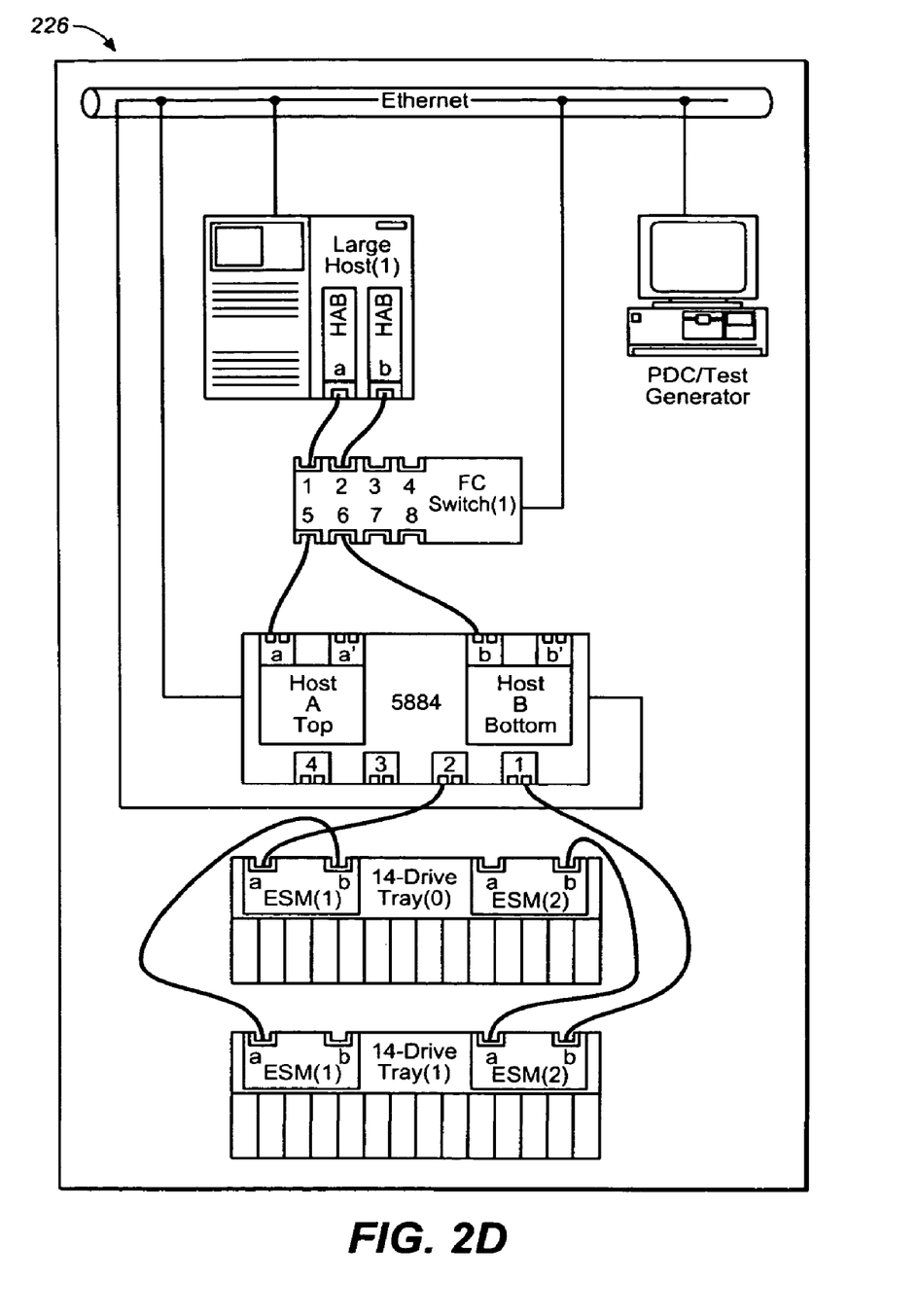

If the input configuration is valid, the first tool generates an animated configuration of the valid configuration to the template 216. Referring to FIG. 2D, an illustration providing additional detail of the configuration sketch portion represented in FIG. 2B in accordance with an exemplary embodiment of the present invention is shown. As is demonstrated in FIG. 2C, the animated configuration is output to a configuration sketch portion 226 of the template. If the entered configuration is not valid, and the user selects to build a configuration, the system may display a valid configuration and indicate a substitute component, software, or other parameter which has been substituted to replace the faulty portion.

In another instance, if component data is input to the template, a second tool is configured for utilizing the template to recommend a valid SAN from the SAN data included in the database. For example, the second tool queries the database to generate a valid configuration corresponding to the component data input to the template. If a valid configuration cannot be obtained for the entered data, an animated valid configuration may be generated with an indication that an additional component has been substituted to obtain the animated valid configuration.

In a further instance, an optimized animated configuration is generated to make most efficient utilization of the included components corresponding to the entered SAN component data. Thus, if multiple valid configurations are possible, a system conducting the method may test the configurations to determine if one of the configurations offers superior functionality for the overall system. Generating an optimized configuration may be directly selected or automatically generated by the system, if a threshold is met. For example, if the throughput of the system would increase by a given factor if a component were replaced or the components were reconfigured. Additionally, the software system of the present invention may recommend a step-by-step procedure for establishing the animated SAN by providing a list of instructions or by permitting user interaction with the animated configuration.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems, which may include memory for storing a program of instructions and a processor for performing the program of instruction, wherein the program of instructions configures the processor and information handling system. Until required by the information handling system, the set of instructions may be stored in another readable memory device, for example in a hard disk drive or in a removable medium such as an optical disc.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for storage area network (SAN) establishment, comprising:
providing a predefined template via a computing system, said predefined template configured for inputting data associated with a SAN;
utilizing the predefined template by a first tool to obtain a configuration for a SAN, including component data, when a SAN configuration is input for validation, the first tool querying a database of SAN data for validation of the SAN configuration input for validation;
utilizing the predefined template by a second tool configured for generating a SAN configuration, when component data is input to the predefined template, the second tool accessing the database to generate the SAN configuration;
accessing a database including SAN data;
generating a recommended optimized animated configuration of a valid SAN configuration to the predefined template from the accessed database based on at least one of the SAN configuration input for validation or the input component data, the recommended optimized animated configuration of a valid SAN configuration being automatically generated by the system in response to a determination that a throughput of the system would increase by a predetermined factor due to component replacement or component reconfiguration, the generating of the recommended optimized animated configuration of the valid SAN configuration further including outputting the recommended optimized animated configuration to a configuration sketch portion of the predefined template.

2. The method of claim 1, further comprising recommending the recommended optimized SAN configuration based on the input component data.

3. The method of claim 1, wherein the SAN data includes at least one of wiring configuration data, zoning configuration data, host clustering data, host bus adapter data, or software parameter data.

4. The method of claim 1, wherein the generating of the recommended optimized animated configuration includes providing a warning of an input non-conforming component, when no match is found in the database for the input component.

5. The method of claim 1, wherein the generating of the recommended optimized animated configuration includes recommending a conforming component when no match is found in the database for input component data.

6. The method of claim 1, further comprising recommending a step-by-step procedure for establishing the SAN based on the recommended optimized animated configuration.

7. The method of claim 6, further comprising cross-referencing printed documentation associated with a step included in the step-by-step procedure.

8. The method of claim 1, wherein the SAN data includes a redundant array of independent disks (RAID) configuration.

9. A system for storage area network (SAN) establishment, comprising:

a non-transitory electronically readable medium encoded to cause a central processing unit executing the software system for storage area network (SAN) establishment to effectively generate:
  a template configured for inputting SAN data including SAN component data;
  a database of SAN data;
  a first tool configured for utilizing the template to determine when an input SAN configuration is valid based upon the database of SAN data, the first tool further configured for querying the database of SAN data for validation of the input SAN configuration; and
  a second tool configured for utilizing the template to recommend a valid SAN configuration selected from the SAN data included in the database, when component data is input, the second tool further configured for accessing the database to generate the SAN configuration,
  wherein the software system generates a recommended optimized animated configuration of a valid SAN configuration based on SAN data input to the template, said generating of said recommended optimized animated configuration of a valid SAN configuration being automatically performed by the system when component replacement or component reconfiguration allows said system to have a throughput which is greater than a predetermined throughput threshold for the system, said generation of said recommended optimized animated configuration further including outputting the recommended optimized animated configuration to a configuration sketch portion of the template.

10. The system of claim 9, wherein the database containing the SAN data includes at least one of wiring configuration data, zoning configuration data, host clustering data, host bus adapter data, or software parameter data.

11. The system of claim 9, wherein the template recommends a conforming component, when no match is found in the database for an input SAN component.

12. The system of claim 9, wherein the template recommends a step-by-step procedure for establishing the animated SAN.

13. The system of claim 9, wherein the database contains redundant array of independent disks (RAID) configuration data.

14. The system of claim 9, wherein generating the recommended optimized animated configuration includes providing a warning of an input non-conforming component, when no match is found in the database for an input SAN component in the SAN component data.

15. A method for storage area network (SAN) establishment, comprising:
  receiving a predefined template via a computing system, the predefined template configured for SAN component information;
  receiving the SAN component information, the receiving performed based on the predefined template;
  accessing a database of SAN data;
  obtaining a configuration for a SAN including component data when a SAN configuration is input for validation, wherein:
    the obtaining is performed in part by a first tool,
    the obtaining utilizes the predefined template, and
    the obtaining includes querying the database of SAN data for validation of the SAN configuration input for validation;
  generating a SAN configuration when component data is input to the predefined template, wherein:
    the generating is performed in part by a second tool,
    the generating utilizes the predefined template, and
    the generating includes accessing the database to generate the SAN configuration;
  comparing the received SAN component information with the database of SAN data to generate a recommended optimized animated configuration of a valid SAN configuration based on the SAN data input to the template, the generating of the recommended optimized animated configuration of the valid SAN configuration being automatically performed by the computing system in response to a determination that component replacement or component reconfiguration allows the computing system to have a throughput which is greater than a predetermined throughput threshold for the computing system, the generating of the recommended optimized animated configuration further including outputting the recommended optimized animated configuration to a configuration sketch portion of the predefined template.

16. The method of claim 15, wherein the SAN component information includes at least one of wiring configuration data, zoning configuration data, a host clustering data, host bus adapter data, redundant array of independent disks (RAID) configuration data, and software parameter data.

17. The method of claim 15, wherein the comparing of the received SAN component information with the database of SAN data includes providing a warning of a non-conforming component.

18. The method of claim 15, wherein the comparing of the received SAN component information with the database of SAN data includes recommending a step-by-step procedure for establishing the animated SAN.

19. The method of claim 15, wherein the SAN component information includes a redundant array of independent disks (RAID) configuration.

20. The method of claim 15, wherein the generating of the recommended optimized animated configuration includes recommending a conforming component when no match is found in the database for a SAN component of the received SAN component information.

* * * * *